United States Patent
Okamoto

(10) Patent No.: US 10,749,379 B2
(45) Date of Patent: Aug. 18, 2020

(54) POWER SUPPLY APPARATUS AND CONTROL METHOD THEREOF

(71) Applicant: CANON KABUSHIKI KAISHA, Tokyo (JP)

(72) Inventor: Yoshihiko Okamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 15/933,613

(22) Filed: Mar. 23, 2018

(65) Prior Publication Data

US 2018/0287424 A1 Oct. 4, 2018

(30) Foreign Application Priority Data

Mar. 28, 2017 (JP) .................. 2017-063748

(51) Int. Cl.
| | |
|---|---|
| H02J 50/10 | (2016.01) |
| H02J 7/02 | (2016.01) |
| H02J 50/12 | (2016.01) |
| H02J 50/80 | (2016.01) |
| H04B 5/00 | (2006.01) |
| A47L 9/28 | (2006.01) |
| A47L 9/00 | (2006.01) |

(52) U.S. Cl.
CPC ............ *H02J 50/10* (2016.02); *A47L 9/00* (2013.01); *A47L 9/2852* (2013.01); *A47L 9/2873* (2013.01); *H02J 7/025* (2013.01); *H02J 50/12* (2016.02); *H02J 50/80* (2016.02); *H04B 5/0037* (2013.01); *H04B 5/0081* (2013.01); *A47L 2201/022* (2013.01)

(58) Field of Classification Search
None
See application file for complete search history.

(56) References Cited

U.S. PATENT DOCUMENTS

| | | | | |
|---|---|---|---|---|
| 5,821,731 | A * | 10/1998 | Kuki | B60L 53/65 320/108 |
| 8,410,751 | B2 * | 4/2013 | Terao | H01F 38/14 320/108 |
| 9,660,487 | B1 * | 5/2017 | Mu | H02J 50/90 |
| 2013/0154554 | A1 * | 6/2013 | Sakai | H02J 7/0027 320/108 |

FOREIGN PATENT DOCUMENTS

JP 2015-042050 A 3/2015

* cited by examiner

*Primary Examiner* — Jared Fureman
*Assistant Examiner* — Joel Barnett
(74) *Attorney, Agent, or Firm* — Cowan, Liebowitz & Latman, P.C.

(57) ABSTRACT

A power supply apparatus comprises a power supply unit configured to supply power to a power reception apparatus in a non-contact manner, a communication unit configured to perform communication with the power reception apparatus and a movable power supply apparatus, and a control unit configured to, when power suppliable to the power reception apparatus does not satisfy a predetermined condition, control the movable power supply apparatus to supply power from the movable power supply apparatus to the power reception apparatus.

21 Claims, 10 Drawing Sheets

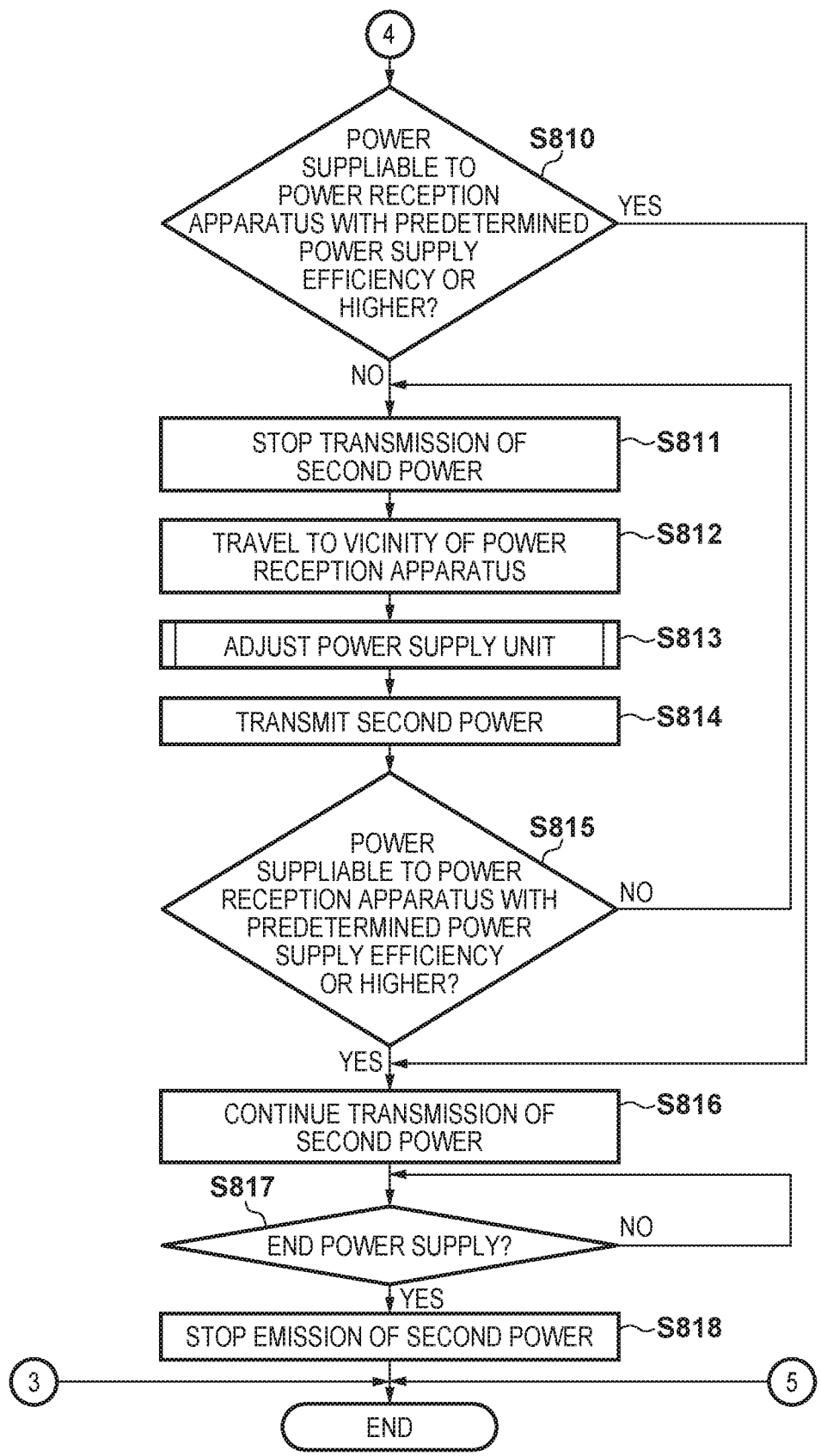

POWER SUPPLY APPARATUS AND CONTROL METHOD THEREOF

BACKGROUND OF THE INVENTION

Field of the Invention

The present invention relates to a non-contact power supply system that performs non-contact power supply.

Description of the Related Art

In recent years, a non-contact power supply system is known in which a power supply apparatus, provided with an array antenna composed of a plurality of antenna elements, performs non-contact power supply to a power reception apparatus by outputting microwaves as power.

One of the features of such a non-contact power supply system is that it has a wider power supply range than a non-contact power supply system using an electromagnetic induction method or a magnetic field resonance method. Furthermore, in a non-contact power supply system, even if a power supply apparatus was able to detect a power reception apparatus via non-contact communication by exchanging information related to power supply via non-contact communication, there is a possibility that the reception apparatus exists in a range in which power supply cannot be performed or a range in which the power supply efficiency is significantly low.

Japanese Patent Laid-Open No. 2015-042050 describes, as a technique to perform power supply from a power supply apparatus to a power reception apparatus under the above-described circumstances, a technique to output supply power upon reception of a power supply request from the power reception apparatus when a communication range is equal to or wider than a power-suppliable range, regardless of whether the power reception apparatus exists within the power supply range.

However, according to Japanese Patent Laid-Open No. 2015-042050, as the power supply apparatus outputs the supply power also when the power reception apparatus does not exist within the power-suppliable range, there is a possibility that the supply power goes to waste.

SUMMARY OF THE INVENTION

The present invention has been made in consideration of the aforementioned problems, and realizes a technique that can reliably and efficiently supply power to a power reception apparatus.

In order to solve the aforementioned problems, the present invention provides a power supply apparatus comprising: a power supply unit configured to supply power to a power reception apparatus in a non-contact manner; a communication unit configured to perform communication with the power reception apparatus and a movable power supply apparatus; and a control unit configured to, when power suppliable to the power reception apparatus does not satisfy a predetermined condition, control the movable power supply apparatus to supply power from the movable power supply apparatus to the power reception apparatus.

In order to solve the aforementioned problems, the present invention provides a power supply apparatus comprising: a power supply unit configured to supply power to a power reception apparatus in a non-contact manner; a communication unit configured to perform communication with the power reception apparatus and another power supply apparatus; a self-traveling unit configured to achieve a positional movement; and a control unit configured to perform control to, upon receiving a power supply request from the another power supply apparatus via the communication unit, achieve a movement to a position where power supply to the power reception apparatus is possible via the self-traveling unit, and supply power to the power reception apparatus.

In order to solve the aforementioned problems, the present invention provides a control method of a power supply apparatus which has a power supply unit configured to supply power to a power reception apparatus in a non-contact manner and a communication unit configured to perform communication with the power reception apparatus and a movable power supply apparatus, the method comprising: when power suppliable to the power reception apparatus does not satisfy a predetermined condition, controlling the movable power supply apparatus to supply power from the movable power supply apparatus to the power reception apparatus.

In order to solve the aforementioned problems, the present invention provides a control method of a power supply apparatus which has a power supply unit configured to supply power to a power reception apparatus in a non-contact manner, a communication unit configured to perform communication with the power reception apparatus and another power supply apparatus, and a self-traveling unit configured to achieve a positional movement, the method comprising: performing control to, upon receiving a power supply request from the another power supply apparatus via the communication unit, achieve a movement to a position where power supply to the power reception apparatus is possible via the self-traveling unit, and supply power to the power reception apparatus.

In order to solve the aforementioned problems, the present invention provides a non-transitory computer-readable storage medium storing a program for causing a computer to function as a power supply apparatus comprising: a power supply unit configured to supply power to a power reception apparatus in a non-contact manner; a communication unit configured to perform communication with the power reception apparatus and a movable power supply apparatus; and a control unit configured to, when power suppliable to the power reception apparatus does not satisfy a predetermined condition, control the movable power supply apparatus to supply power from the movable power supply apparatus to the power reception apparatus.

In order to solve the aforementioned problems, the present invention provides a non-transitory computer-readable storage medium storing a program for causing a computer to function as a power supply apparatus comprising: a power supply unit configured to supply power to a power reception apparatus in a non-contact manner; a communication unit configured to perform communication with the power reception apparatus and another power supply apparatus; a self-traveling unit configured to achieve a positional movement; and a control unit configured to perform control to, upon receiving a power supply request from the another power supply apparatus via the communication unit, achieve a movement to a position where power supply to the power reception apparatus is possible via the self-traveling unit, and supply power to the power reception apparatus.

According to the present invention, power can be supplied to a power reception apparatus reliably and efficiently.

Further features of the present invention will become apparent from the following description of exemplary embodiments (with reference to the attached drawings).

BRIEF DESCRIPTION OF THE DRAWINGS

FIGS. 5A-1 and 5A-2 are flowcharts showing power supply control processing executed by the main power supply apparatus according to a first embodiment.

FIGS. 8A and 8B are flowcharts showing power supply control processing executed by the movable power supply apparatus according to a second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

<System Configuration>

Figure 1:
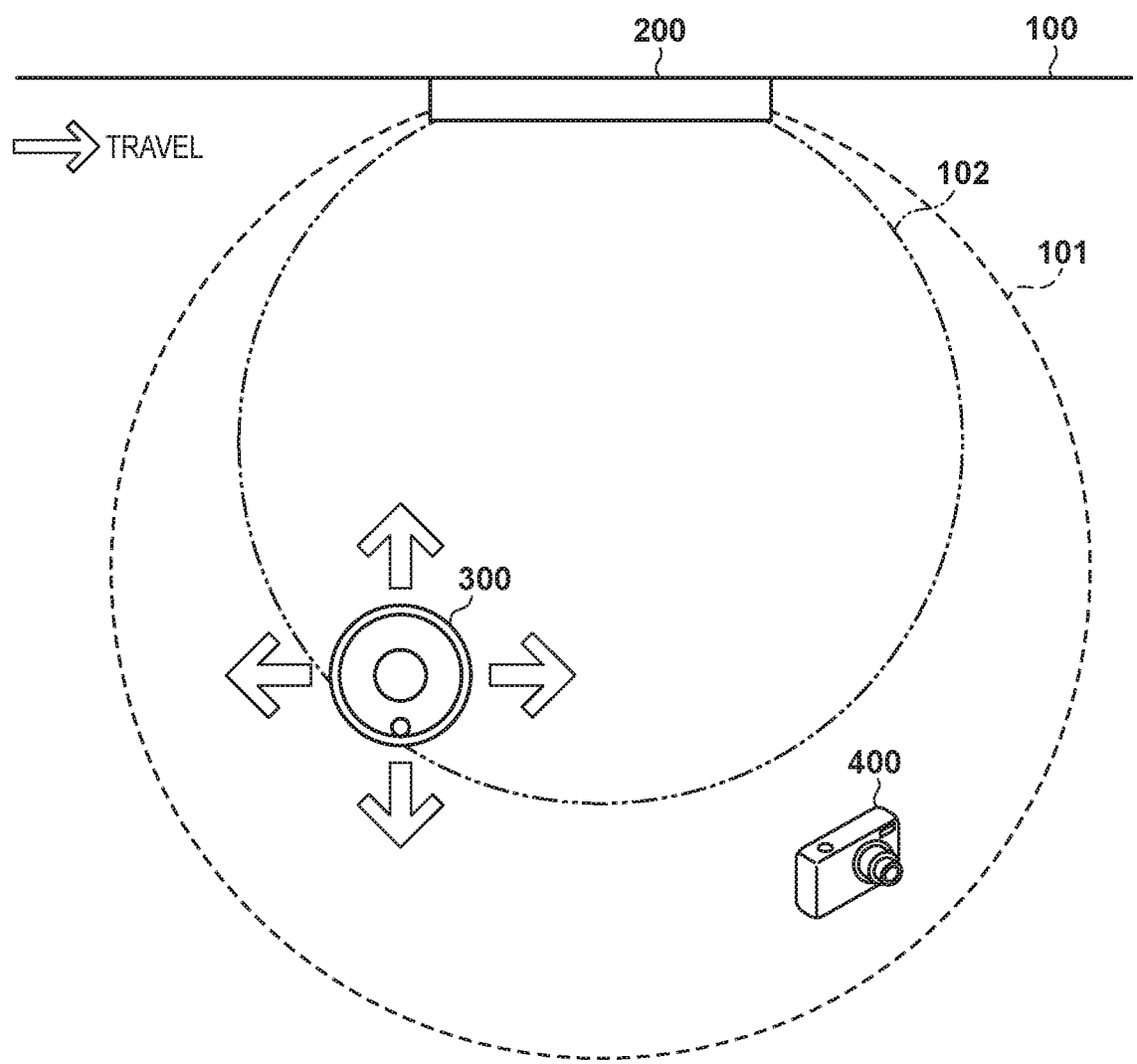
FIG. 1 is a system configuration diagram according to the present embodiments.

First, a configuration of a non-contact power supply system according to the present embodiment will be described with reference to FIG. 1.

A non-contact power supply system 100 according to the present embodiment includes a main power supply apparatus 200, a movable power supply apparatus 300 that performs wireless communication with the main power supply apparatus 200 and receives a power supply request, and a power reception apparatus 400 that performs wireless communication with the main power supply apparatus 200 and the movable power supply apparatus 300 and receives power.

The main power supply apparatus 200 performs wireless communication with devices that exist within a communicable range 101 via a communication unit 204, and detects the existence of the movable power supply apparatus 300 and the power reception apparatus 400. After the communication is established, the main power supply apparatus 200 receives, from the movable power supply apparatus 300 and the power reception apparatus 400, their respective device information pieces.

Upon confirming, from the received device information pieces, that the power reception apparatus 400 is a device to which power can be supplied, the main power supply apparatus 200 emits supply power, which is microwaves, using an array antenna 203. Meanwhile, when the main power supply apparatus 200 has received power reception information from the power reception apparatus 400 via wireless communication and determined that the power supply efficiency is equal to or lower than a predetermined reference value, it determines that the power reception apparatus 400 does not exist within a power-suppliable range 102, and stops the emission of supply power.

When the main power supply apparatus 200 has determined that the power reception apparatus 400 does not exist within the power-suppliable range 102, it transmits, to the movable power supply apparatus 300 via wireless communication, a power supply request for supplying power to the power reception apparatus 400.

Upon receiving the power supply request from the main power supply apparatus 200 via a communication unit 308, the movable power supply apparatus 300 travels so as to approach a position where it can supply power to the power reception apparatus 400 by controlling a self-traveling unit 304, and emits supply power to the power reception apparatus 400 using an array antenna 303.

Note that when the main power supply apparatus 200 has determined, from the received device information pieces, that the movable power supply apparatus 300 is also a device to receive power, it can emit supply power also to the movable power supply apparatus 300.

The power reception apparatus 400 is an electronic device that operates under power supplied from a secondary battery 404. Examples of the power reception apparatus 400 include such electronic devices as an image capturing apparatus (e.g., a digital camera), a communication terminal (e.g., a mobile telephone and a smartphone, which is one type of a mobile telephone), an information terminal (e.g., a tablet-type computer), and a mobile player that reproduces audio and video. The power reception apparatus 400 may also be a moving body (e.g., an automobile) that is driven by power supplied from the secondary battery 404. The power reception apparatus 400 may also be an electronic device that can operate under power supplied from the main power supply apparatus 200 or the movable power supply apparatus 300 in a case where the secondary battery 404 is not installed therein.

<Configuration of Main Power Supply Apparatus 200>

Figure 2:
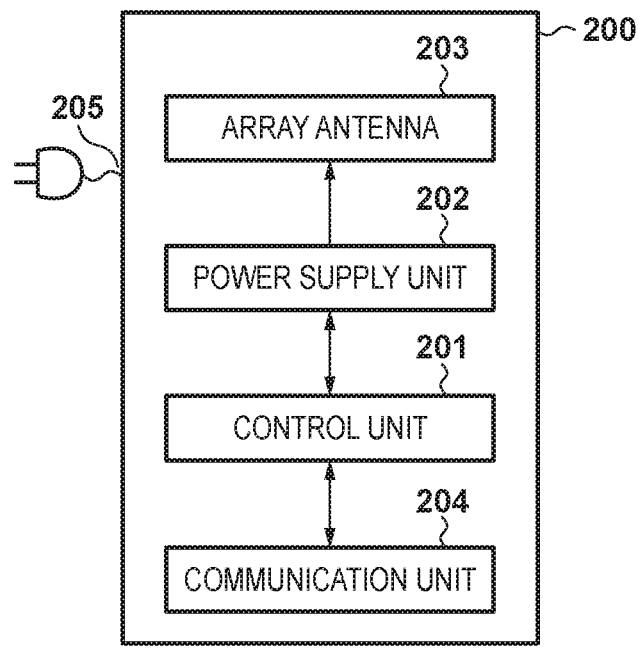
FIG. 2 is a block diagram showing a configuration of a main power supply apparatus according to the present embodiments.

Next, a configuration and functions of the main power supply apparatus 200 according to the present embodiment will be described with reference to FIG. 2. The main power supply apparatus 200 may be an apparatus that is dedicated to power supply, or may also have functions of another apparatus. For example, it may be any of a light, an air conditioner, a timepiece, a sprinkler, a fire alarm, and the like that are mounted near a ceiling and provided with functions of the main power supply apparatus. In general, these apparatuses are apparatuses that are intended to distribute light, wind, water, and the like across a room, and thus have a high possibility of being mounted at a position where they easily spread radio waves across the room. Therefore, they are easily mounted at a position that is favorable for the main power supply apparatus 200 according to the present embodiment.

The main power supply apparatus 200 includes a control unit 201, a power supply unit 202, the array antenna 203, and the communication unit 204.

The control unit 201 includes an arithmetic processing apparatus, such as a CPU, and a storage apparatus, such as a memory, and controls the operations of various units of the main power supply apparatus 200 by executing computer programs stored in the memory. In addition to the computer programs, information, such as parameters related to the operations of various units of the main power supply apparatus 200, is also stored in the memory.

The power supply unit 202 is connected to the control unit 201 and the array antenna 203, and supplies power to the array antenna 203 under control of the control unit 201. The power supply unit 202 can generate first power that is emitted by the array antenna 203 to specify a position of a power supply target device, and second power that is emitted by the array antenna 203 to supply power to a power supply target device. Furthermore, the second power may be power that is larger than the first power.

The array antenna 203 has a plurality of antenna elements. Each of the plurality of antenna elements is individually connected to the power supply unit 202, and receives power that is controlled in terms of phase and amplitude from the power supply unit 202. The array antenna 203 outputs combined power output from the antenna elements as supply power. The supply power output from the array antenna 203 has directionality because it is the combined output of power that is output from the antenna elements and controlled in terms of phase and amplitude. As the array antenna 203 has such directionality, the main power supply apparatus 200 can emit the second power, which is the supply power, toward the power reception apparatus 400. Note that the antenna elements themselves may have directionality or may be non-directional.

The communication unit 204 includes an antenna for wireless communication and a communication control unit. The communication unit 204 performs wireless communication with the movable power supply apparatus 300 and the power reception apparatus 400 based on a predetermined wireless communication standard. The predetermined wireless communication standard is, for example, a wireless LAN (Wireless Local Area Network) standard or a Bluetooth® standard. The main power supply apparatus 200 can perform wireless communication not only with the movable power supply apparatus 300 and the power reception apparatus 400, but also with any electronic device compliant with the same wireless communication standard.

A power source unit 205 converts alternating-current power supplied from an external commercial power source (AC power source) into direct-current power, and supplies the converted direct-current power to various units of the main power supply apparatus 200.

<Configuration of Movable Power Supply Apparatus 300>

Figure 3:
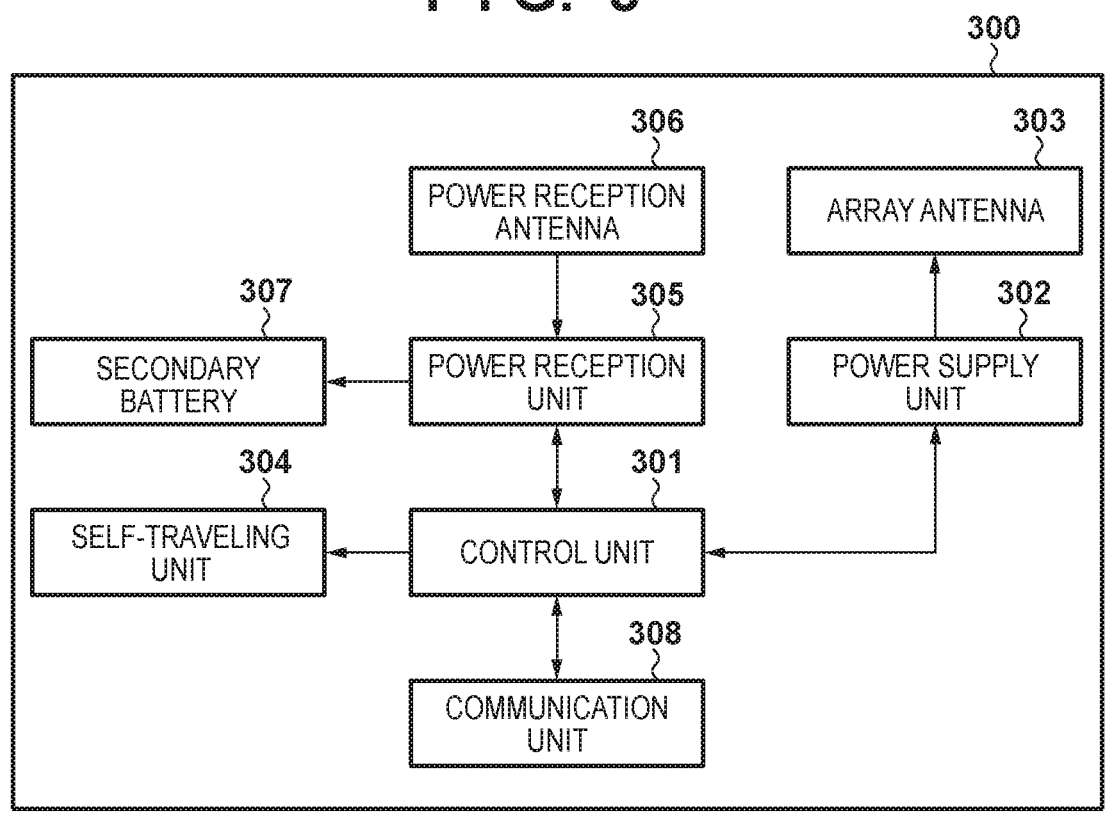
FIG. 3 is a block diagram showing a configuration of a movable power supply apparatus according to the present embodiments.

Next, a configuration and functions of the movable power supply apparatus 300 according to the present embodiment will be described with reference to FIG. 3. The movable power supply apparatus 300 may be an apparatus that is dedicated to power supply, or may also have functions of another apparatus. For example, it may be any of a self-traveling cleaner, a delivery robot, and the like that are provided with functions of the movable power supply apparatus.

The movable power supply apparatus 300 includes a control unit 301, a power supply unit 302, the array antenna 303, the self-traveling unit 304, a power reception unit 305, a power reception antenna 306, a secondary battery 307, and the communication unit 308.

The control unit 301 includes an arithmetic processing apparatus, such as a CPU, and a storage apparatus, such as a memory, and controls the operations of various units of the movable power supply apparatus 300 by executing computer programs stored in the memory. In addition to the computer programs, information, such as parameters related to the operations of various units of the movable power supply apparatus 300, is also stored in the memory.

The power supply unit 302 is connected to the control unit 301 and the array antenna 303, and supplies power to the array antenna 303 under control of the control unit 301. The power supply unit 302 can generate first power that is emitted by the array antenna 303 to specify a position of a power supply target device, and second power that is emitted by the array antenna 303 to supply power to a power supply target device. Furthermore, the second power may be power that is larger than the first power.

The array antenna 303 has a plurality of antenna elements. Each of the plurality of antenna elements is individually connected to the power supply unit 302, and receives power that is controlled in terms of phase and amplitude from the power supply unit 302. The array antenna 303 outputs combined power output from the antenna elements as supply power. The supply power output from the array antenna 303 has directionality because it is the combined output of power that is output from the antenna elements and controlled in terms of phase and amplitude. As the array antenna 303 has such directionality, the second power, which is the supply power, can be emitted toward the power reception apparatus 400. Note that the antenna elements themselves may have directionality or may be non-directional.

The self-traveling unit 304 is composed of drive wheels, a drive motor for driving the drive wheels, a revolutions sensor of the drive motor, and so on. The control unit 301 causes the movable power supply apparatus 300 to move forward, move backward, and change in direction by controlling the drive motor. The control unit 301 also controls acceleration, deceleration, and stopping of the movable power supply apparatus 300 by controlling the number of revolutions of the drive motor detected from the revolutions sensor of the drive motor.

The power reception unit 305 is connected to the control unit 301, the power reception antenna 306, and the secondary battery 307. The power reception unit 305 receives power that has been emitted from the main power supply apparatus 200 and received by the power reception antenna 306, rectifies and smooths the received power, and charges the secondary battery 307 by supplying the power thereto. The power reception unit 305 may be configured to place the rectified and smoothed power at a predetermined voltage, and supply the resultant power to the control unit 301 and the communication unit 308. Furthermore, the power reception unit 305 can detect a power level of received power, and also detect a remaining capacity of the secondary battery 307.

The power reception antenna 306 is composed of a meander line antenna or a planar microstrip antenna. The power reception antenna 306 receives supply power, which is microwaves, output from the main power supply apparatus 200, and supplies the supply power to the power reception unit 305. Furthermore, the power reception antenna 306 may include a rectifying unit of the power reception unit 305 and constitute a rectenna.

The secondary battery 307 is a secondary battery that is built in the movable power supply apparatus 300, or is attachable thereto and removable therefrom. The secondary battery 307 is a rechargeable battery and is, for example, a lithium-ion battery and the like. The secondary battery 307 can supply power to various units of the movable power supply apparatus 300.

The communication unit 308 includes an antenna for wireless communication and a communication control unit. The communication unit 308 performs wireless communication with the main power supply apparatus 200 and the power reception apparatus 400 based on a predetermined wireless communication standard. The predetermined wireless communication standard is, for example, a wireless LAN (Wireless Local Area Network) standard or a Bluetooth® standard. The movable power supply apparatus 300 can perform wireless communication not only with the main power supply apparatus 200 and the power reception apparatus 400, but also with any electronic device compliant with the same wireless communication standard.

<Configuration of Power Reception Apparatus 400>

Figure 4:
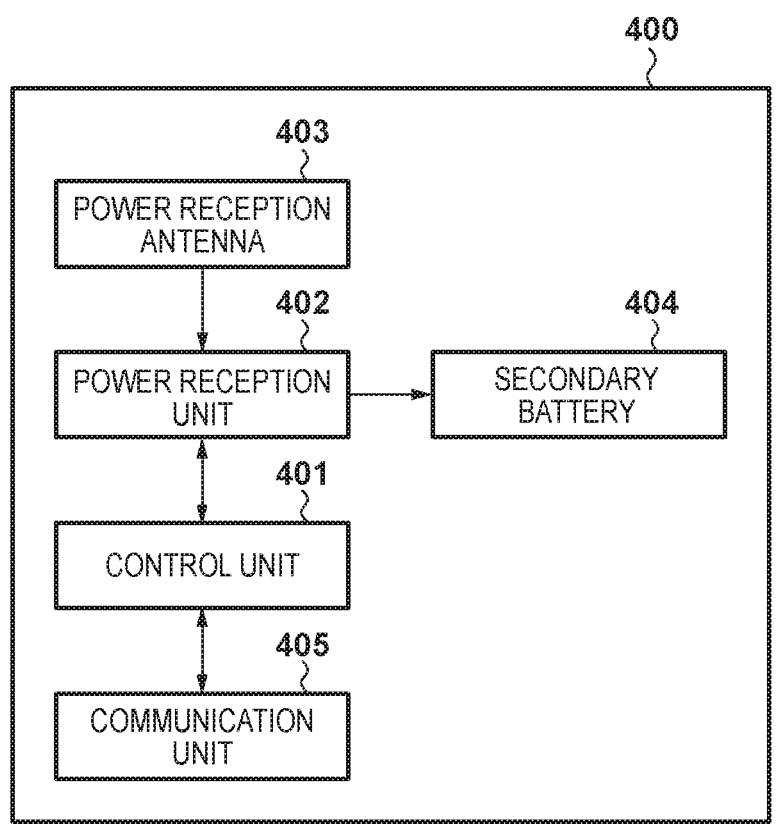
FIG. 4 is a block diagram showing a configuration of a power reception apparatus according to the present embodiments.

Next, a configuration and functions of the power reception apparatus 400 according to the present embodiment will be described with reference to FIG. 4.

The power reception apparatus 400 includes a control unit 401, a power reception unit 402, a power reception antenna 403, and the secondary battery 404.

The control unit 401 includes an arithmetic processing apparatus, such as a CPU, and a storage apparatus, such as a memory, and controls the operations of various units of the power reception apparatus 400 by executing computer programs stored in the memory. In addition to the computer programs, information, such as parameters related to the operations of various units of the power reception apparatus 400, is also stored in the memory.

The power reception unit 402 is connected to the control unit 401, the power reception antenna 403, and the secondary battery 404. The power reception unit 402 receives power that has been emitted from the main power supply apparatus 200 or the movable power supply apparatus 300 and received by the power reception antenna 403, rectifies and smooths the received power, and charges the secondary battery 404 by supplying the power thereto. The power reception unit 402 may be configured to place the rectified and smoothed power at a predetermined voltage, and supply the resultant power to the control unit 401 and the communication unit 405. Furthermore, the power reception unit 402 can detect a power level of received power, and also detect a remaining capacity of the secondary battery 404.

The power reception antenna 403 is composed of a meander line antenna or a planar microstrip antenna. The power reception antenna 403 receives supply power, which is microwaves, output from the main power supply apparatus 200 or the movable power supply apparatus 300, and supplies the supply power to the power reception unit 402. Furthermore, the power reception antenna 403 may include a rectifying unit of the power reception unit 402 and constitute a rectenna.

The secondary battery 404 is a secondary battery that is built in the power reception apparatus 400, or is attachable thereto and removable therefrom. The secondary battery 404 is a rechargeable battery and is, for example, a lithium-ion battery and the like. The secondary battery 404 can supply power to various units of the power reception apparatus 400.

The communication unit 405 includes an antenna for wireless communication and a communication control unit. The communication unit 405 performs wireless communication with the main power supply apparatus 200 and the movable power supply apparatus 300 based on a predetermined wireless communication standard. The predetermined wireless communication standard is, for example, a wireless LAN (Wireless Local Area Network) standard or a Bluetooth® standard. The power reception apparatus 400 can perform wireless communication not only with the main power supply apparatus 200 and the movable power supply apparatus 300, but also with any electronic device compliant with the same wireless communication standard.

<Operations of Main Power Supply Apparatus 200>

Figures 1, 5A:
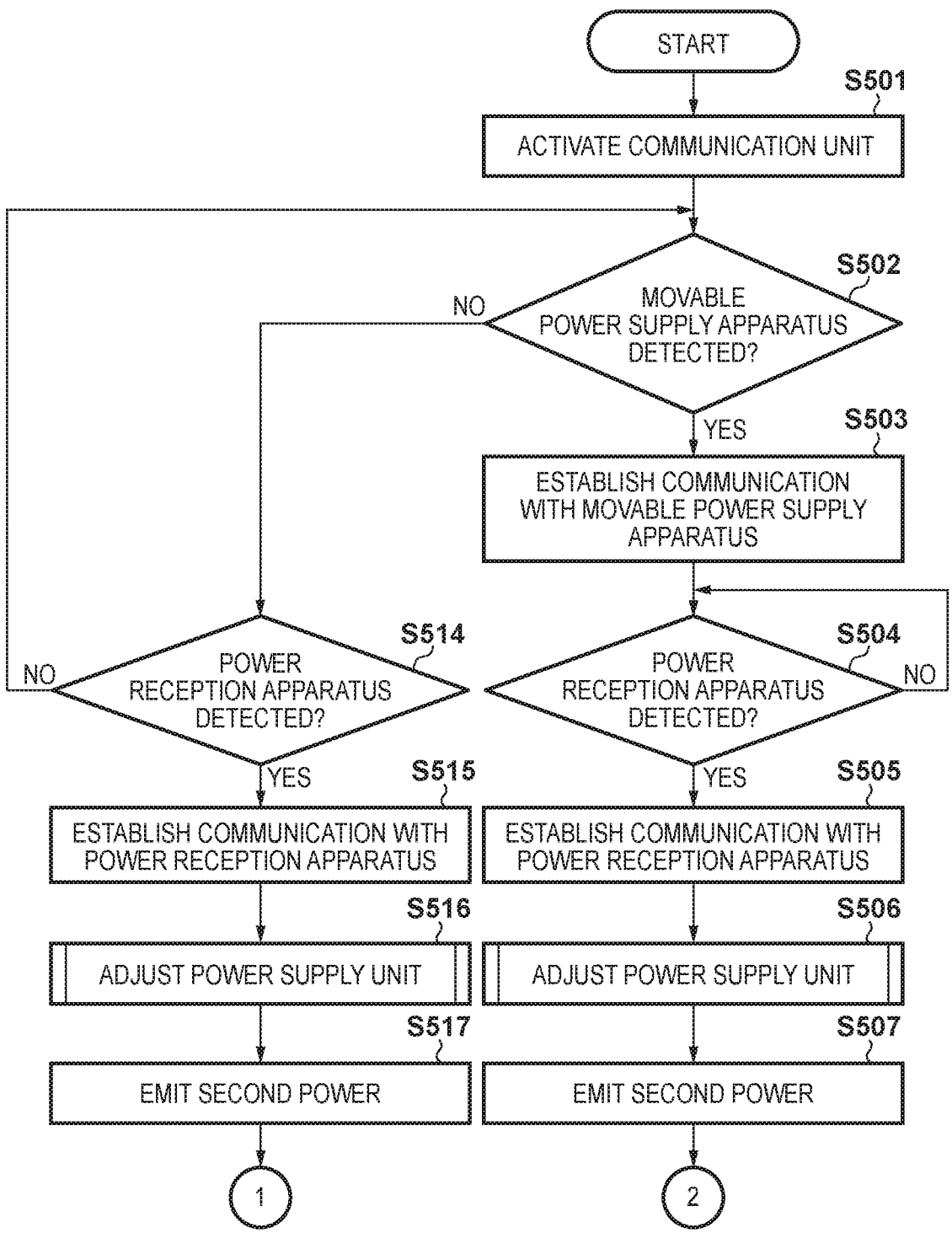
Figures 2, 5A:
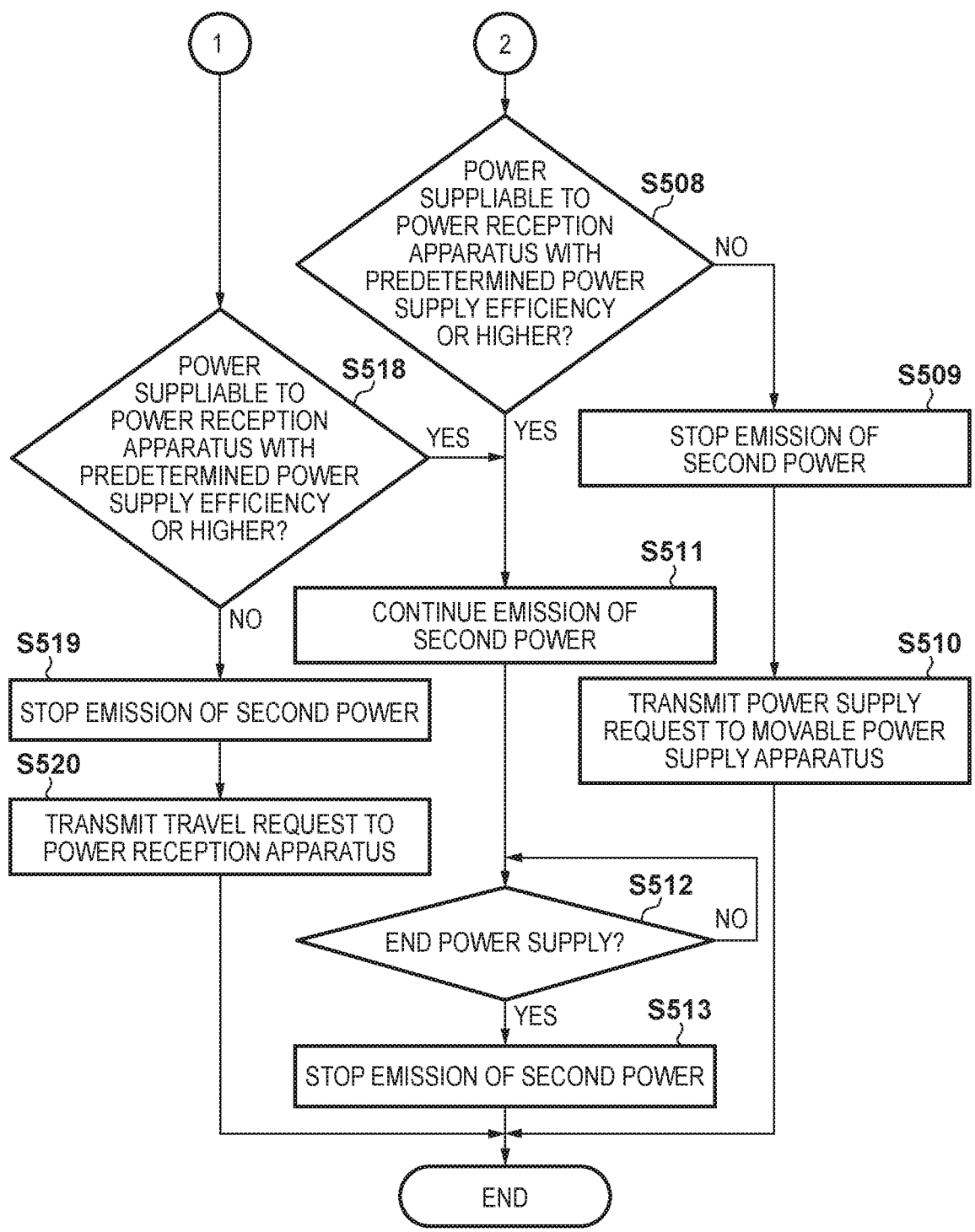

Next, power supply control processing executed by the main power supply apparatus 200 according to the present embodiment will be described with reference to FIGS. 5A-1 and 5A-2. Note that the present processing is realized by the control unit 201 executing the computer programs stored in the memory. The same goes for later-described FIG. 5B.

In step S501, the control unit 201 transmits a communication connection request signal to devices that exist within the communicable range 101 by controlling the communication unit 204, and proceeds to the process of step S502.

In step S502, the control unit 201 determines whether a response signal corresponding to the communication connection request signal transmitted in step S501 has been received from the movable power supply apparatus 300. If the response signal has been received from the movable power supply apparatus 300 (YES of step S502), the control unit 201 determines that the movable power supply apparatus 300 exists within the communicable range 101, and proceeds to the process of step S503. If the response signal has not been received (NO of step S502), the control unit 201 determines that the movable power supply apparatus 300 does not exist within the communicable range 101, and proceeds to the process of step S514.

In step S503, the control unit 201 establishes wireless communication with the movable power supply apparatus 300 via the communication unit 204, and proceeds to the process of step S504.

In step S504, the control unit 201 determines whether a response signal corresponding to the communication connection request signal transmitted in step S501 has been received from the reception apparatus 400. If the response signal has been received from the power reception apparatus 400 (YES of step S504), the control unit 201 determines that the power reception apparatus 400 exists within the communicable range 101, and proceeds to the process of step S505. If the response signal has not been received (NO of step S504), the control unit 201 determines that the power reception apparatus 400 does not exist within the communicable range 101, and waits until the response signal is received from the power reception apparatus 400.

In step S505, the control unit 201 establishes wireless communication with the power reception apparatus 400 via the communication unit 204, and proceeds to the process of step S506.

In step S506, the control unit 201 adjusts the power supply unit 202, and proceeds to the process of step S507. The details of processing for adjusting the power supply unit 202 will be described later using FIG. 5B.

In step S507, the control unit 201 emits second power to the power reception apparatus 400 by controlling the power supply unit 202. At this time, in order to increase the power supply efficiency, the control unit 201 may reduce the directionality of power in the emission of the second power compared to the emission of first power. Here, a reduction in the directionality means a reduction in the half power beamwidth of a main lobe that emits the largest power. The control unit 201 emits the second power to the power reception apparatus 400, and proceeds to the process of step S508.

In step S508, the control unit 201 receives received power information from the power reception apparatus 400 via the communication unit 204. The power supply efficiency is calculated from the received power information that has been received and the second power emitted in step S507. If the calculated power supply efficiency is lower than a predetermined reference value (NO of step S508), the control unit 201 determines that the power reception apparatus 400 does not exist within the power-suppliable range 102, and proceeds to the process of step S509. If the calculated power supply efficiency is equal to or higher than the predetermined reference value (YES of step S508), the control unit 201 determines that the power reception apparatus 400 exists within the power-suppliable range 102, and proceeds to the process of step S510.

In step S509, the control unit 201 stops the emission of the second power by controlling the power supply unit 202, and proceeds to the process of step S511.

In step S510, the control unit 201 transmits a power supply request signal intended for the power reception apparatus 400 to the movable power supply apparatus 300 by controlling the communication unit 204, and ends the present processing.

In step S511, the control unit 201 continuously emits the second power to the power reception apparatus 400 by controlling the power supply unit 202, and proceeds to the process of step S512.

In step S512, the control unit 201 determines whether a power supply termination request signal has been received from the power reception apparatus 400 via the communication unit 204. If the power supply termination request signal has been received from the power reception apparatus 400 (YES of step S512), the process of step S513 follows. If the power supply termination request signal has not been received (NO of step S512), the control unit 201 keeps emitting the second power to the power reception apparatus 400 until the power supply termination request signal is received via the communication unit 204.

In step S513, the control unit 201 stops the emission of the second power by controlling the power supply unit 202, and ends the present processing.

In step S514, the control unit 201 determines whether a response signal corresponding to the communication connection request signal transmitted in step S501 has been received from the reception apparatus 400 via the communication unit 204. If the response signal has been received from the power reception apparatus 400 (YES of step S514), the control unit 201 determines that the power reception apparatus 400 exists within the communicable range 101, and proceeds to the process of step S515. If the response signal has not been received (NO of step S514), the control unit 201 determines that the power reception apparatus 400 does not exist within the communicable range 101, and returns to the process of step S502.

As the processes from step S515 to step S517 are the same as the processes from step S505 to step S507, a description thereof will be omitted.

In step S518, the control unit 201 receives received power information from the power reception apparatus 400 via the communication unit 204. The power supply efficiency is calculated from the received power information that has been received and the second power emitted in step S517. If the calculated power supply efficiency is lower than a predetermined reference value (NO of step S518), the control unit 201 determines that the power reception apparatus 400 does not exist within the power-suppliable range 102, and proceeds to the process of step S519. If the calculated power supply efficiency is equal to or higher than the predetermined reference value (YES of step S518), the control unit 201 determines that the power reception apparatus 400 exists within the power-suppliable range 102, and proceeds to the process of step S511.

In step S519, the control unit 201 stops the emission of the second power by controlling the power supply unit 202, and proceeds to the process of step S520.

In step S520, the control unit 201 determines that the power reception apparatus 400 exists within the communicable range 101 but does not exist within the power-suppliable range 102, transmits a travel request signal for requesting travel to the inside of the power-suppliable range 102 to the power reception apparatus 400 by controlling the communication unit 204, and ends the present processing.

Through the present processing, when power supply cannot be performed because the power reception apparatus 400 does not exist within the power-suppliable range 102 of the main power supply apparatus 200, or when power supply is possible but the power supply efficiency is significantly low, a power supply request is transmitted to the movable power supply apparatus 300. This enables the movable power supply apparatus 300 to travel to a position where it can supply power to the power reception apparatus 400 and carry out the power supply in place of the main power supply apparatus 200.

Note that information indicating a relationship between received power information that was received in step S507 and a distance between the main power supply apparatus 200 and the power reception apparatus 400 may be stored to the memory in advance, so that information of a distance between the main power supply apparatus 200 and the power reception apparatus 400 can be calculated from received power information that was received. It is permissible to perform control to transmit a power supply request signal to the movable power supply apparatus 300 when the calculated information of the distance indicates that the main power supply apparatus 200 and the power reception apparatus 400 are distanced from each other by a predetermined distance or more. Furthermore, the calculated information of the distance can be transmitted to the movable power supply apparatus 300 via the communication unit 204.

<Processing for Adjusting Power Supply Unit>

Figure 5B:
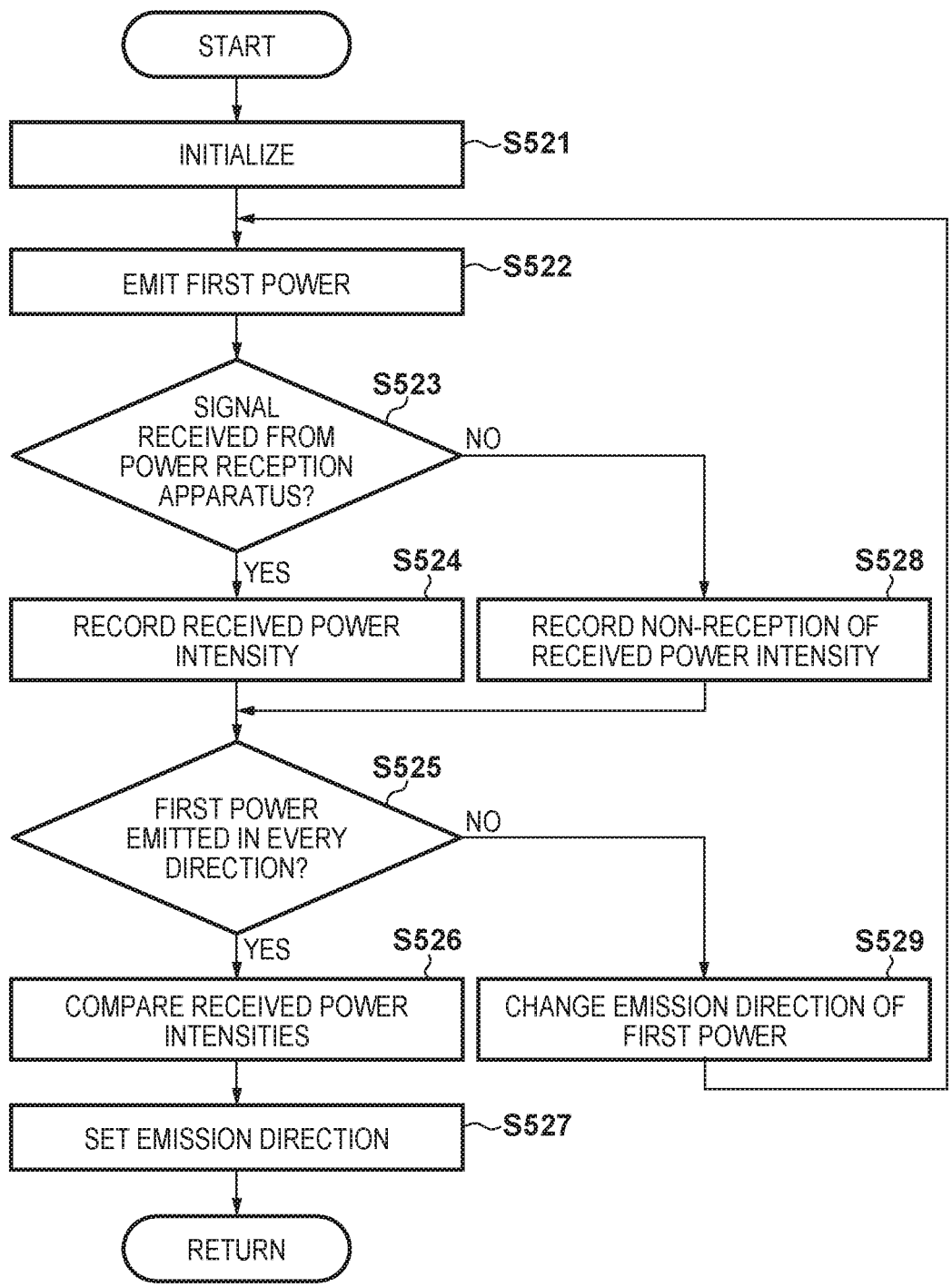
FIG. 5B is a flowchart showing power supply control processing executed by the main power supply apparatus according to the first embodiment.

Next, the details of processing for adjusting the power supply unit 202 in steps S506 and S516 of FIG. 5A-1 will be described with reference to FIG. 5B.

In step S521, the control unit 201 initializes setting information of the power supply unit 202, and proceeds to the process of step S522. In this initialization processing, for example, setting values related to the direction of power emission and the amount of emitted power are initialized. Initializing the direction of power emission means, for example, setting the direction of power emission to a 0°-direction relative to a plane of the array antenna 203. Initializing the amount of emitted power means, for example, in a case where an output range of the second power is between 0.25 W to 0.5 W, setting the output value of the second power to the smallest 0.25 W. Alternatively, the amount of emitted power may be set to an output value of the first power, which is an even smaller output.

In step S522, the control unit 201 emits the first power in the emission direction initialized in step S521 by controlling the power supply unit 202 and the array antenna 203, and proceeds to the process of step S523.

In step S523, the control unit 201 determines whether a received power intensity signal has been received from the power reception apparatus 400 via the communication unit 204. If the received power intensity signal has been received from the power reception apparatus 400 within a predetermined period after the emission of the first power in step S522 (YES of step S523), the process of step S524 follows. If the received power intensity signal has not been received (NO of step S523), the process of step S528 follows.

In step S524, the control unit 201 records the emission direction in which the first power was emitted in step S522 and the received power intensity signal received in step S523 in association with each other to the memory, and proceeds to the process of step S525.

In step S525, the control unit 201 determines whether the first power was emitted in every emission direction that is settable. If the first power was emitted in every emission direction (YES of step S525), the process of step S526 follows. If the first power was not emitted in every emission direction (NO of step S525), the process of step S529 follows.

In step S526, the control unit 201 compares information of the combinations of the emission directions of the first power and the received power intensity signals recorded in the memory. The control unit 201 determines that the power reception apparatus 400 exists in the emission direction associated with the maximum received power intensity signal, and proceeds to the process of step S527.

In step S527, the control unit 201 sets the direction detected in step S526 as the emission direction of the second power, and ends the present processing.

In step S528, the control unit 201 records the emission direction in which the first power was emitted in step S522 and the fact that the received power intensity signal was not able to be received in association with each other to the memory, and proceeds to the process of step S525.

In step S529, the control unit 201 sets an emission direction that has not been set yet as the emission direction of the first power, and returns to the process of step S522.

Through the present processing, the main power supply apparatus 200 sets the power supply direction by calculating a rough position of the power reception apparatus 400, and thus can supply power with high power supply efficiency.

<Operations of Movable Power Supply Apparatus 300>

Next, power supply control processing executed by the movable power supply apparatus 300 according to the present embodiment will be described with reference to FIG. 6. The present processing is realized by the control unit 301 executing the computer programs stored in the memory.

In step S601, the control unit 301 activates the communication unit 308 so as to enable communication with devices that exist within a communicable range of the movable power supply apparatus 300, and proceeds to the process of step S602. The control unit 301 controls the communication unit 308 so that a communication connection request signal transmitted from the devices that exist within the communicable range of the movable power supply apparatus 300 can be received, and so that a communication connection request signal can be transmitted to the devices that exist within the communicable range of the movable power supply apparatus 300.

In step S602, the control unit 301 determines whether a communication connection request signal was received from the main power supply apparatus 200 in step S601 via the communication unit 308. If the communication connection request was received from the main power supply apparatus 200 (YES of step S602), the control unit 301 determines that the main power supply apparatus 200 exists within the communicable range, and proceeds to the process of step S603. If the communication connection request was not received (NO of step S602), the control unit 301 determines that the main power supply apparatus 200 does not exist within the communicable range, and ends the present processing.

In step S603, the control unit 301 establishes wireless communication with the main power supply apparatus 200 via the communication unit 308, and proceeds to the process of step S604.

In step S604, the control unit 301 determines whether a response signal corresponding to the communication connection request signal transmitted in step S601 has been received from the reception apparatus 400 via the communication unit 308. If the response signal has been received from the power reception apparatus 400 (YES of step S604), the control unit 301 determines that the power reception apparatus 400 exists within the communicable range, and proceeds to the process of step S605. If the response signal has not been received (NO of step S604), the control unit 301 determines that the power reception apparatus 400 does not exist within the communicable range, and waits until the response signal is received from the power reception apparatus 400.

In step S605, the control unit 301 establishes wireless communication with the power reception apparatus 400 via the communication unit 308, and proceeds to the process of step S606.

In step S606, the control unit 301 determines whether a power supply request signal has been received from the main power supply apparatus 200 via the communication unit 308. If the power supply request signal has been received from the main power supply apparatus 200 (YES of step S606), the control unit 301 determines that a power supply target device exists, and proceeds to the process of step S607. If the power supply request signal has not been received (NO of step S606), the control unit 301 determines that a power supply target device does not exist, and ends the present processing.

The processes of steps S607 and S608 are similar to the processes of steps S506 and S507.

In step S609, the control unit 301 receives received power information from the power reception apparatus 400 via the communication unit 308. The power supply efficiency is calculated from the received power information that has been received and the second power emitted in step S608. If the calculated power supply efficiency is lower than a predetermined reference value (NO of step S609), the control unit 301 determines that the power reception apparatus 400 does not exist within a power-suppliable range, and proceeds to the process of step S610. If the calculated power supply efficiency is equal to or higher than the predetermined reference value (YES of step S609), the control unit 301 determines that the power reception apparatus 400 exists within the power-suppliable range, and proceeds to the process of step S615.

In step S610, the control unit 301 stops the emission of the second power by controlling the power supply unit 302, and proceeds to the process of step S611.

In step S611, the control unit 301 causes a movement toward the position of the power reception apparatus 400 calculated in step S607 by controlling the self-traveling unit 304, and proceeds to the process of step S612.

In step S612, the control unit 301 executes processing for adjusting the power supply unit 302 again. The processes of steps S612 and S613 are similar to the processes of steps S607 and S608.

In step S614, the control unit 301 receives received power information from the power reception apparatus 400 via the communication unit 308. The power supply efficiency is calculated from the received power information that has been received and the second power emitted in step S613. If the calculated power supply efficiency is lower than a predetermined reference value (NO of step S614), the control unit 301 determines that the power reception apparatus 400 does not exist within the power-suppliable range, and returns to the process of step S610. If the calculated power supply efficiency is equal to or higher than the predetermined reference value (YES of step S614), the control unit 301 determines that the power reception apparatus 400 exists within the power-suppliable range, and proceeds to the process of step S615.

In step S615, the control unit 301 continuously emits the second power to the power reception apparatus 400 by controlling the power supply unit 302, and proceeds to the process of step S616.

In step S616, the control unit 301 determines whether a power supply termination request signal has been received from the power reception apparatus 400 via the communication unit 308. If the power supply termination request signal has been received from the power reception apparatus 400 (YES of step S616), the control unit 301 determines that power supply to the power reception apparatus 400 has been completed, and proceeds to the process of step S617. If the power supply termination request signal has not been received (NO of step S616), the control unit 301 keeps emitting the second power to the power reception apparatus 400 by controlling the power supply unit 302 until reception of the power supply termination request signal from the power reception apparatus 400 is detected.

In step S617, the control unit 301 stops the emission of the second power by controlling the power supply unit 302, and ends the present processing.

Through the present processing, when power supply cannot be performed because the power reception apparatus 400 does not exist within the power-suppliable range 102 of the main power supply apparatus 200, or when power supply is possible but the power supply efficiency is significantly low, the movable power supply apparatus 300 can travel to a position where it can supply power to the power reception apparatus 400 and carry out the power supply in place of the main power supply apparatus 200.

Note that in the description of the present flowchart, the movable power supply apparatus 300 starts to travel after establishing communication with the power reception apparatus 400 in steps S604 and S605. In contrast, it may receive, from the main power supply apparatus 200, information of the position of the power reception apparatus 400 that was calculated by the main power supply apparatus 200 in step S506 after establishing communication with the main power supply apparatus 200 in step S603, and start to travel before establishing communication with the power reception apparatus 400.

Furthermore, although the completion of power supply is determined upon reception of the power supply termination request signal from the power reception apparatus 400 in step S616, control may be performed to end the emission of power after a predetermined period has elapsed following the emission of the second power in step S613.

<Operations of Power Reception Apparatus 400>

Figure 7:
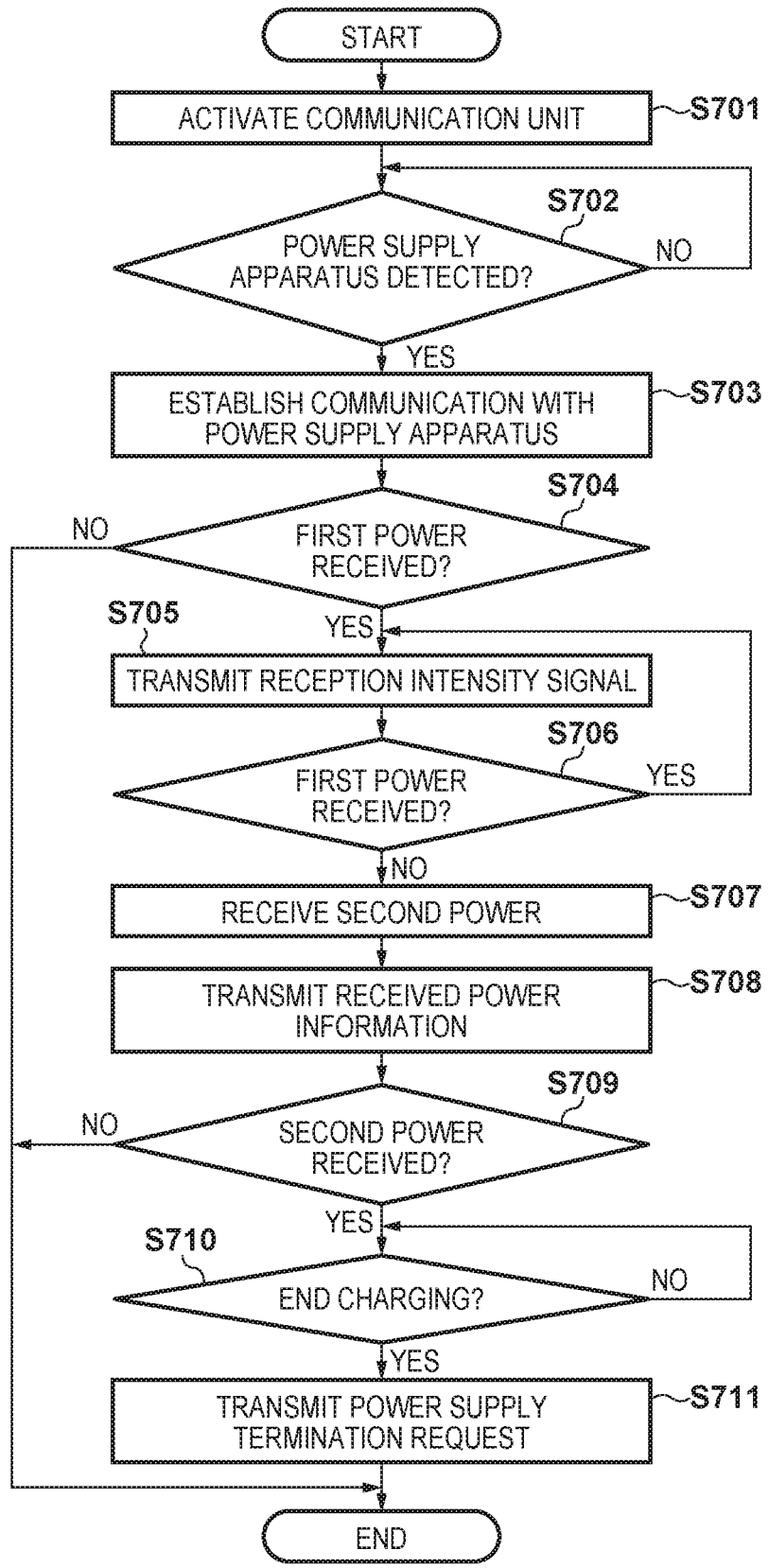
FIG. 7 is a flowchart showing power reception control processing executed by the power reception apparatus according to the first embodiment.

Next, power reception control processing executed by the power reception apparatus 400 according to the present embodiment will be described with reference to FIG. 7. The present processing is realized by the control unit 401 executing the computer programs stored in the memory.

In step S701, the control unit 401 activates the communication unit 405 so as to enable communication with devices that exist within a communicable range of the power reception apparatus 400, and proceeds to the process of step S702. The control unit 401 controls the communication unit 405 so that a communication connection request signal transmitted from the devices that exist within the communicable range can be received.

In step S702, the control unit 401 determines whether a communication connection request signal has been received from the main power supply apparatus 200 or the movable power supply apparatus 300 via the communication unit 405.

If the communication connection request has been received from the main power supply apparatus 200 or the movable power supply apparatus 300 (YES of step S702), the control unit 401 determines that the main power supply apparatus 200 or the movable power supply apparatus 300 exists within the communicable range, and proceeds to the process of step S703. If the communication connection request signal has not been received (NO of step S702), the control unit 401 determines that the main power supply apparatus 200 or the movable power supply apparatus 300 does not exist within the communicable range, and waits until the communication connection request signal is received from the main power supply apparatus 200 or the movable power supply apparatus 300.

In step S703, the control unit 401 establishes wireless communication with the main power supply apparatus 200 or the movable power supply apparatus 300 via the communication unit 405, and proceeds to the process of step S704.

In step 3704, the control unit 401 determines whether first power emitted from the main power supply apparatus 200 or the movable power supply apparatus 300, with which communication was established in step S702, has been received via the power reception antenna 403. If the first power emitted from the power supply apparatus 200 or the movable power supply apparatus 300 has been received (YES of step S704), the control unit 401 determines that the power reception apparatus 400 exists within the power-suppliable range of the main power supply apparatus 200 or the movable power supply apparatus 300, and proceeds to the process of step S705. If the first power has not been received (NO of step S704), the control unit 401 determines that the power reception apparatus 400 does not exist within the power-suppliable range of the main power supply apparatus 200 or the movable power supply apparatus 300, and ends the present processing.

In step S705, the control unit 401 detects a power level of the first power received in step S704, transmits information of the detected level of the received power as received power intensity signal to the main power supply apparatus 200 or the movable power supply apparatus 300 via the communication unit 405, and proceeds to the process of step S706.

In step S706, similarly to the process of step S704, the control unit 401 determines whether the first power from the main power supply apparatus 200 or the movable power supply apparatus 300 has been received again via the power reception antenna 403. It returns to the process of step S705 if the first power has been received again from the power supply apparatus 200 or the movable power supply apparatus 300 (YES of step S706). If the first power has not been received (NO of step S706), the control unit 401 determines that the processing for adjusting the power supply unit 202 of the main power supply apparatus 200 or the processing for adjusting the power supply unit 302 of the movable power supply apparatus 300 has ended, and proceeds to the process of step S707.

In step S707, the control unit 401 receives second power emitted from the main power supply apparatus 200 or the movable power supply apparatus 300 via the power reception antenna 403. The control unit 401 supplies the received power to the secondary battery 404, and proceeds to the process of step S708.

In step S708, the control unit 401 detects a power level of the second power received in step S707, transmits information of the detected power level as received power information to the main power supply apparatus 200 or the movable power supply apparatus 300 via the communication unit 405, and proceeds to the process of step S709.

In step S709, the control unit 401 determines whether the second power emitted from the main power supply apparatus 200 or the movable power supply apparatus 300 has been continuously received via the power reception antenna 403. If the second power has been continuously received from the main power supply apparatus 200 or the movable power supply apparatus 300 (YES of step S709), the control unit 401 continues processing for charging the secondary battery 404, and proceeds to the process of step S710. If the second power has not been received (NO of step S709), the control unit 401 determines that power supply processing of the main power supply apparatus 200 or the movable power supply apparatus 300 has ended, and ends the present processing.

In step S710, the control unit 401 detects a remaining capacity of the secondary battery 404, and if the remaining capacity of the secondary battery 404 is equal to or larger than a predetermined capacity (YES of step S710), the control unit 401 ends the processing for charging the secondary battery 404 by controlling the power reception unit 402, and proceeds to the process of step S711. If the remaining capacity of the secondary battery 404 is smaller than the predetermined capacity (NO of step S710), the control unit 401 continues the processing for charging the secondary battery 404.

In step S711, the control unit 401 transmits a power supply termination request signal to the main power supply apparatus 200 or the movable power supply apparatus 300 via the communication unit 405, and ends the present processing.

Through the present processing, the power reception apparatus 400 can receive power emitted from a power supply apparatus and charge the secondary battery 404.

Furthermore, it is permissible to perform control to display travel request information on a non-illustrated notification unit based on a travel request signal received from the main power supply apparatus 200.

Second Embodiment

Next, power supply control processing executed by the movable power supply apparatus 300 according to a second embodiment will be described.

In the foregoing first embodiment, upon receiving a power supply request signal from the main power supply apparatus 200, the movable power supply apparatus 300 travels so as to approach a position where it can supply power to the power reception apparatus 400, and executes the power supply processing. However, there may be a case where the movable power supply apparatus 300 is, for example, a device that can execute functions other than power supply (e.g., a cleaning function), such as a self-traveling cleaner and a self-traveling robot. Therefore, there is a possibility that it cannot travel for the purpose of an operation other than power supply even if a power supply request signal has been received from the main power supply apparatus 200.

Figure 6:
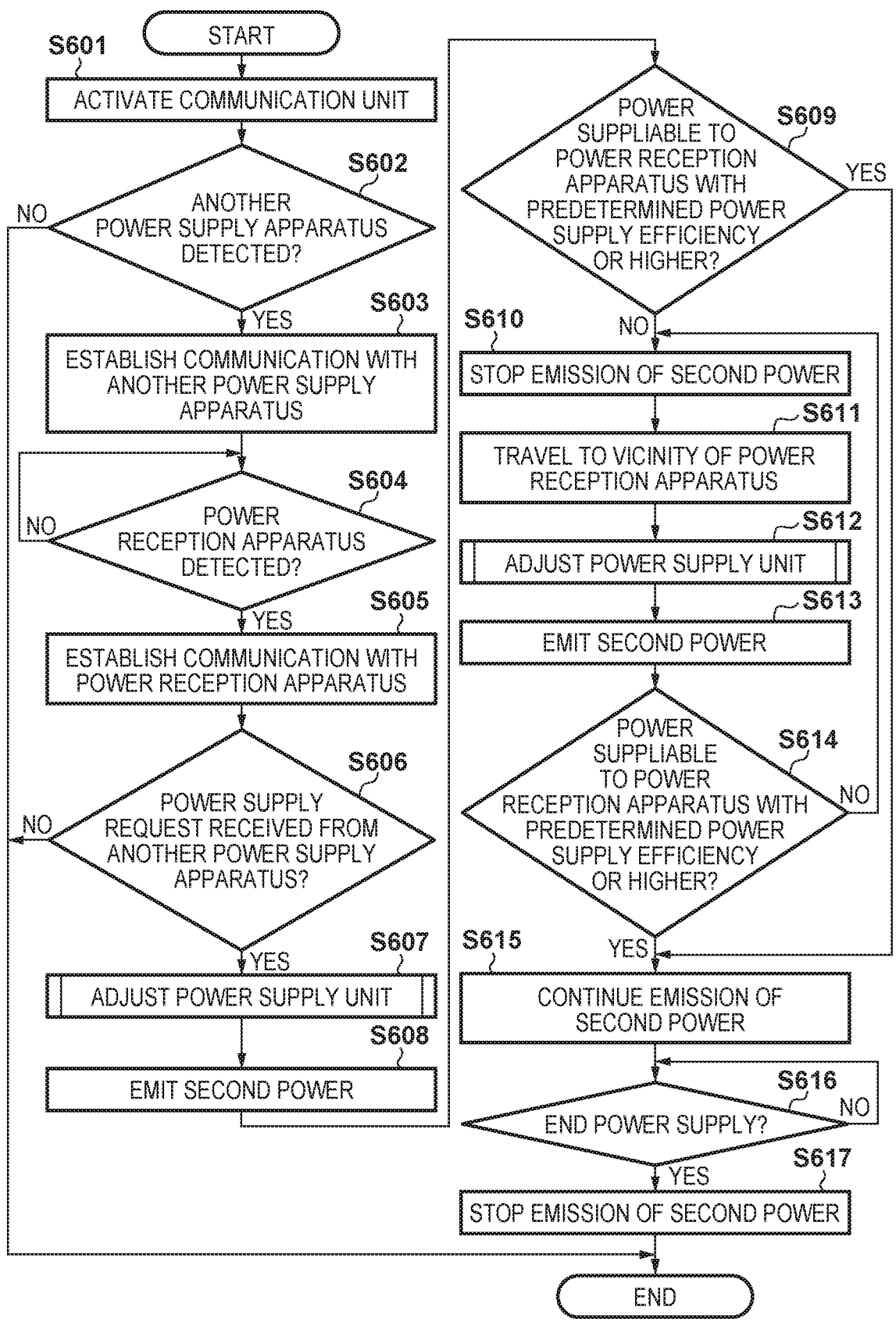
FIG. 6 is a flowchart showing power supply control processing executed by the movable power supply apparatus according to the first embodiment.

In view of this, the second embodiment describes processing for setting the order of priority regarding whether to prioritize the operation other than power supply or prioritize traveling when the movable power supply apparatus 300 cannot travel, in addition to the power supply control processing that has been described using FIG. 6.

Figure 8A:
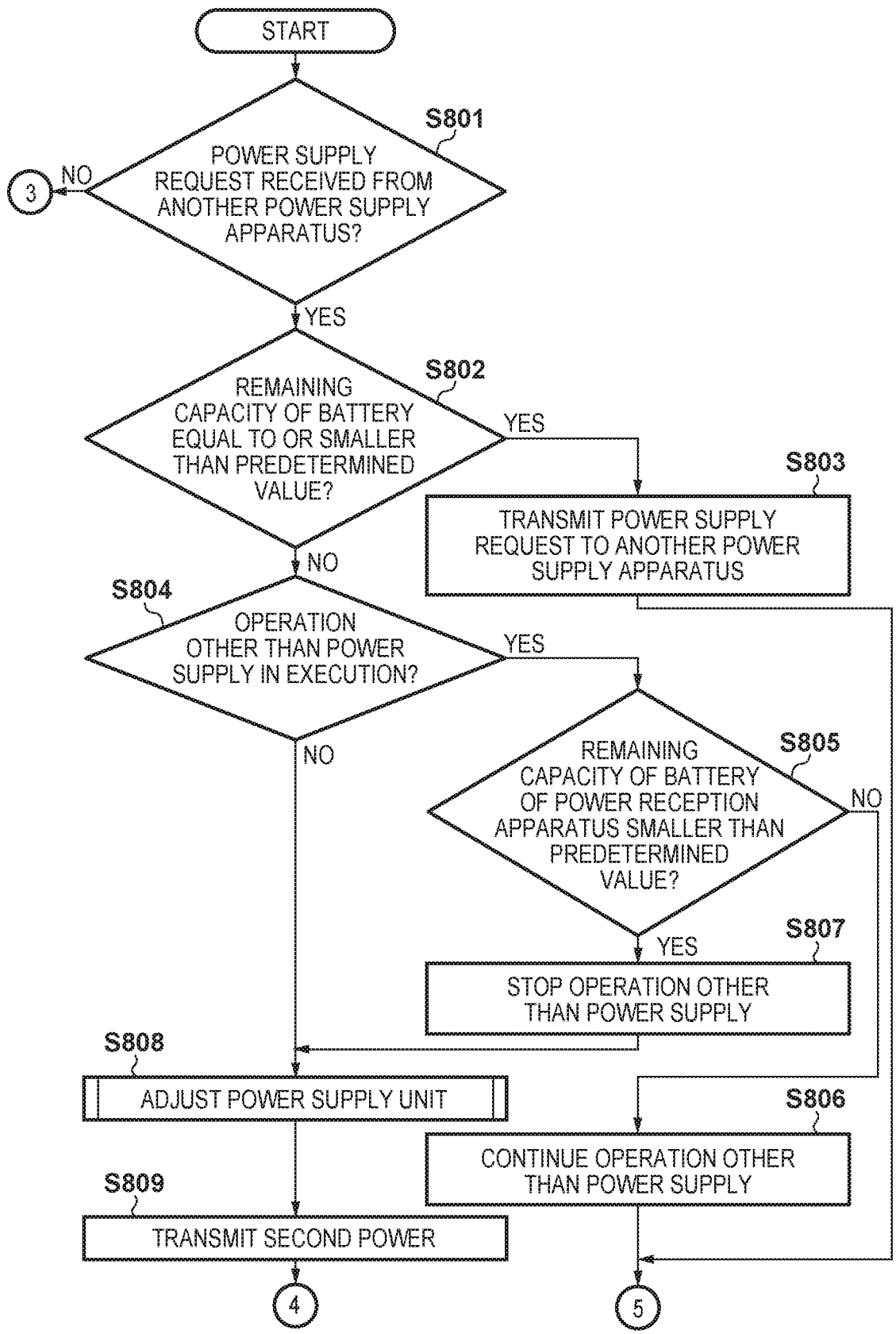

FIGS. 8A and 8B are flowcharts showing power supply control processing executed by the movable power supply apparatus 300 according to the second embodiment. The present processing is realized by the control unit 301 executing the computer programs stored in the memory. Note that as the processes from step S808 to step S818 of FIGS. 8A and 8B are similar to the processes from step S607 to step S617 of FIG. 6, a description thereof will be omitted. Furthermore, a configuration and functions of the movable power supply apparatus 300 are similar to those of FIG. 3. The following describes an example in which the movable power supply apparatus 300 is a self-traveling cleaner with cleaning functions.

In step S801, the control unit 301 determines whether a power supply request signal has been received from the main power supply apparatus 200 via the communication unit 308. If the power supply request signal has been received from the main power supply apparatus 200 (YES of step S801), the control unit 301 determines that a power supply target device exists, and proceeds to the process of step S803. If the power supply request signal has not been received (NO of step S801), the control unit 301 determines that a power supply target device does not exist, and ends the present processing.

In step S802, the control unit 301 detects a remaining capacity of the secondary battery 307, and proceeds to the process of step S802 if the remaining capacity of the secondary battery 307 is smaller than a predetermined capacity (YES of step S802), and proceeds to the process of step S804 if the remaining capacity of the secondary battery 307 is equal to or larger than the predetermined capacity (NO of step S802).

In step S803, the control unit 301 transmits a power supply request signal to a power supply apparatus that exists within the communicable range and is other than the main power supply apparatus 200 via the communication unit 308, and ends the present processing. It may simultaneously transmit, to the main power supply apparatus 200, a signal indicating that a power supply request cannot be accepted.

In step S804, the control unit 301 determines whether a predetermined operation other than power supply is in execution, and proceeds to the process of step S805 if the operation other than power supply is in execution (YES of step S804), and proceeds to the process of step S808 if the operation other than power supply is not in execution (NO of step S804).

In step S805, the control unit 301 receives information related to a remaining capacity of the secondary battery 404 from the power reception apparatus 400 via the communication unit 308. If the remaining capacity of the secondary battery 404 is smaller than a predetermined capacity based on the information acquired from the power reception apparatus 400 (YES of step S805), the control unit 301 determines that processing for supplying power to the power reception apparatus 400 is necessary, and proceeds to the process of step S807. If the remaining capacity of the secondary battery 404 is equal to or larger than the predetermined capacity (NO of step S805), the control unit 301 determines that the processing for supplying power to the power reception apparatus 400 is not necessary, and proceeds to the process of step S806.

In step S806, the control unit 301 continuously executes the predetermined operation other than power supply, and ends the present processing.

In step S807, in order to execute the processing for supplying power to the power reception apparatus 400, the control unit 301 suspends the predetermined operation and proceeds to the process of step S808.

As the processes from step S808 to step S818 similar to the processes from step S607 to step S617, a description thereof will be omitted.

Through the present processing, even when the movable power supply apparatus 300 is executing an operation other than power supply, the use of a power supply function and the use of a function other than power supply can be appropriately separated from each other.

Note that in step S802, even if the secondary battery 307 is smaller than the predetermined capacity, the power supply processing may be executed on the spot by stopping the self-traveling unit 304, and the power supply processing may be continued if it is determined that the power supply efficiency is higher than that of the main power supply apparatus 200.

Furthermore, in step S807, even if the operation other than power supply is in execution, the power supply processing and the operation other than power supply may be executed simultaneously in a case where the operation other than power supply is an operation that can be executed simultaneously with the power supply processing.

Although the first and second embodiments have been described under the assumption that the main power supply apparatus 200 is not configured to include a self-traveling unit, it may include a self-traveling unit. In this case, after calculating the efficiency of power supply to the power reception apparatus 400, the main power supply apparatus 200 travels so as to approach a position where it can supply power to the power reception apparatus 400, and executes the power supply processing again. When the power supply efficiency is not increased even by the power supply processing after traveling, a power supply request signal may be transmitted to the movable power supply apparatus 300.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-063748, filed Mar. 28, 2017 which is hereby incorporated by reference herein in its entirety.

What is claimed is:

1. A power supply apparatus comprising:
a power supply unit configured to supply power to a power reception apparatus in a non-contact manner;
a communication unit configured to perform communication with the power reception apparatus and a movable power supply apparatus; and
a control unit configured to, when power suppliable to the power reception apparatus does not satisfy a predetermined condition, control the movable power supply apparatus to supply power from the movable power supply apparatus to the power reception apparatus.

2. The apparatus according to claim 1, wherein
when power suppliable to the power reception apparatus does not satisfy a predetermined condition, the control unit transmits, to the movable power supply apparatus, a power supply request for supplying power to the power reception apparatus.

3. The apparatus according to claim 1, wherein
the predetermined condition is that efficiency of power supply to the power reception apparatus is equal to or lower than a predetermined value.

4. The apparatus according to claim 1, wherein
the predetermined condition is that a distance from the power reception apparatus is a predetermined distance or more.

5. The apparatus according to claim 1, wherein
when the predetermined condition is not satisfied, the control unit transmits a travel request to the power reception apparatus via the communication unit.

6. The apparatus according to claim 1, further comprising:
a connection unit connected to an external power source,
wherein the power supply apparatus operates under power supplied from the external power source connected via the connection unit.

7. The apparatus according to claim 1, further comprising:
a self-traveling unit configured to achieve a positional movement,
wherein when the predetermined condition is not satisfied after the self-traveling unit achieves the movement, the control unit transmits a power supply request to the movable power supply apparatus.

8. The apparatus according to claim 1, wherein
the power supply unit supplies power to the movable power supply apparatus.

9. A power supply apparatus comprising:
a power supply unit configured to supply power to a power reception apparatus in a non-contact manner;

a communication unit configured to perform communication with the power reception apparatus and another power supply apparatus;
a self-traveling unit configured to achieve a positional movement; and
a control unit configured to perform control to, upon receiving a power supply request from the another power supply apparatus via the communication unit, achieve a movement to a position where power supply to the power reception apparatus is possible via the self-traveling unit, and supply power to the power reception apparatus.

10. The apparatus according to claim 9, further comprising:
a power reception unit configured to receive power supplied from the another power supply apparatus in a non-contact manner.

11. The apparatus according to claim 10, further comprising:
a power source unit composed of a secondary battery.

12. The apparatus according to claim 11, further comprising:
a charging unit configured to charge the secondary battery using power received from the another power supply apparatus.

13. The apparatus according to claim 11, wherein
upon receiving a power supply request from the another power supply apparatus, the control unit performs control so as not to achieve a movement via the self-traveling unit when a remaining capacity of the secondary battery is smaller than a predetermined capacity.

14. The apparatus according to claim 11, wherein
when a remaining capacity of the secondary battery is smaller than a predetermined capacity, the control unit transmits a power supply request to the another power supply apparatus via the communication unit.

15. The apparatus according to claim 9, wherein
the control unit is capable of executing a predetermined operation other than power supply with respect to the power reception apparatus, and
upon receiving a power supply request from the another power supply apparatus via the communication unit, the control unit stops the predetermined operation, achieves a movement to a position where power supply to the power reception apparatus is possible via the self-traveling unit, and supplies power to the power reception apparatus.

16. The apparatus according to claim 15, wherein
the control unit acquires information related to a remaining capacity of a secondary battery of the power reception apparatus via the communication unit, and
upon receiving a power supply request from the another power supply apparatus via the communication unit, the control unit stops the predetermined operation, achieves a movement to a position where power supply to the power reception apparatus is possible via the self-traveling unit, and supplies power to the power reception apparatus when the remaining capacity of the secondary battery of the power reception apparatus is smaller than a predetermined capacity.

17. The apparatus according to claim 15, wherein
when the predetermined operation is in execution, the control unit transmits, to the another power supply apparatus via the communication unit, a request for supplying power to the power reception apparatus.

18. A control method of a power supply apparatus which has a power supply unit configured to supply power to a power reception apparatus in a non-contact manner and a communication unit configured to perform communication with the power reception apparatus and a movable power supply apparatus, the method comprising:
when power suppliable to the power reception apparatus does not satisfy a predetermined condition, controlling the movable power supply apparatus to supply power from the movable power supply apparatus to the power reception apparatus.

19. A control method of a power supply apparatus which has a power supply unit configured to supply power to a power reception apparatus in a non-contact manner, a communication unit configured to perform communication with the power reception apparatus and another power supply apparatus, and a self-traveling unit configured to achieve a positional movement, the method comprising:
performing control to, upon receiving a power supply request from the another power supply apparatus via the communication unit, achieve a movement to a position where power supply to the power reception apparatus is possible via the self-traveling unit, and supply power to the power reception apparatus.

20. A non-transitory computer-readable storage medium storing a program for causing a computer to function as a power supply apparatus comprising:
a power supply unit configured to supply power to a power reception apparatus in a non-contact manner;
a communication unit configured to perform communication with the power reception apparatus and a movable power supply apparatus; and
a control unit configured to, when power suppliable to the power reception apparatus does not satisfy a predetermined condition, control the movable power supply apparatus to supply power from the movable power supply apparatus to the power reception apparatus.

21. A non-transitory computer-readable storage medium storing a program for causing a computer to function as a power supply apparatus comprising:
a power supply unit configured to supply power to a power reception apparatus in a non-contact manner;
a communication unit configured to perform communication with the power reception apparatus and another power supply apparatus;
a self-traveling unit configured to achieve a positional movement; and
a control unit configured to perform control to, upon receiving a power supply request from the another power supply apparatus via the communication unit, achieve a movement to a position where power supply to the power reception apparatus is possible via the self-traveling unit, and supply power to the power reception apparatus.

* * * * *